(12) United States Patent
Andoh

(10) Patent No.: US 11,135,656 B2
(45) Date of Patent: Oct. 5, 2021

(54) CUTTING TOOL HOLDER AND CUTTING TOOL

(71) Applicant: NGK SPARK PLUG CO., LTD., Nagoya (JP)

(72) Inventor: Naoki Andoh, Nagoya (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 197 days.

(21) Appl. No.: 16/616,875

(22) PCT Filed: May 11, 2018

(86) PCT No.: PCT/JP2018/018304
§ 371 (c)(1),
(2) Date: Nov. 25, 2019

(87) PCT Pub. No.: WO2018/221162
PCT Pub. Date: Dec. 6, 2018

(65) Prior Publication Data
US 2020/0180040 A1 Jun. 11, 2020

(30) Foreign Application Priority Data
Jun. 1, 2017 (JP) .............................. JP2017-109180

(51) Int. Cl.
*B23B 29/04* (2006.01)
*B23B 27/10* (2006.01)
*B23B 27/16* (2006.01)

(52) U.S. Cl.
CPC ............ *B23B 29/043* (2013.01); *B23B 27/10* (2013.01); *B23B 27/16* (2013.01)

(58) Field of Classification Search
CPC ....... B32B 27/10; B32B 27/086; B32B 29/14; B32B 2205/02; B32B 2240/24; B32B 2205/04; B32B 2250/12; B32B 29/043
See application file for complete search history.

(56) References Cited

U.S. PATENT DOCUMENTS

2003/0082018 A1* 5/2003 Kraemer ................ B23Q 11/10
407/11
2007/0283794 A1* 12/2007 Giannetti ................ B23B 27/10
82/158

(Continued)

FOREIGN PATENT DOCUMENTS

JP 2012-183634 A 9/2012

OTHER PUBLICATIONS

Japan Patent Office, International Search Report issued in corresponding Application No. PCT/JP2018/018304 dated Jul. 10, 2018.

*Primary Examiner* — Eric S Ruppert
*Assistant Examiner* — Stephen Sun Cha
(74) *Attorney, Agent, or Firm* — Stites & Harbison, PLLC; Jeffrey A. Haeberlin

(57) ABSTRACT

A cutting tool includes a holder having an upper jaw and a lower jaw, and an insert clamped between the jaws. A large-diameter hole in a lower-jaw side of the holder communicates with a lower-jaw channel, and a threaded hole in an upper-jaw side of the holder communicates with an upper-jaw channel. A threaded member has a head, a closed-bottom hollow open to the head, branch holes through which the hollow communicates with an outer circumferential surface thereof, and a screw-driving portion in a front end thereof. The threaded member is inserted from the large-diameter hole and screwed into the threaded hole until a front surface of the head seats on a bearing surface of the large-diameter hole and clamps the insert. Then, the large diameter hole, the lower-jaw channel, the hollow, the branch holes, and the upper-jaw channel are in communication for supplying coolant to the insert.

6 Claims, 9 Drawing Sheets

(56) References Cited

U.S. PATENT DOCUMENTS

| | | | | |
|---|---|---|---|---|
| 2008/0124180 A1* | 5/2008 | Breisch | ............... | B23B 29/043 |
| | | | | 407/110 |
| 2011/0250827 A1* | 10/2011 | Smith | ................ | B24B 45/00 |
| | | | | 451/449 |
| 2012/0230780 A1* | 9/2012 | Henry | ................ | B23B 29/043 |
| | | | | 407/11 |
| 2013/0078043 A1* | 3/2013 | Henry | ................ | B23B 27/10 |
| | | | | 407/11 |
| 2014/0064862 A1* | 3/2014 | Breisch | ................ | B23B 27/16 |
| | | | | 407/11 |
| 2014/0270999 A1* | 9/2014 | Huang | ................ | B23B 27/10 |
| | | | | 407/11 |

* cited by examiner

CUTTING TOOL HOLDER AND CUTTING TOOL

TECHNICAL FIELD

The present invention relates to a cutting tool holder used for performing peripheral machining, such as cutting off on a round bar or a like workpiece or grooving on the outer circumferential surface of such a workpiece, by means of turning or the like, and to a cutting tool in which a throwaway-type (tip-replaceable-type) cutting insert (also called a throwaway tip or merely a tip) is clamped (fixed) to a front end (head) of the cutting tool holder.

BACKGROUND ART

In some cases, a cutting tool holder for use in cutting off or the like has an upper jaw and a lower jaw protruding frontward and provided at its front end for holding a cutting insert (hereinafter, may be called merely an insert) therebetween, as well as a slit that is cut rearward in a region located behind a space between the upper and lower jaws. In such a cutting tool holder (hereinafter, may be called merely a holder), a threaded member having a head (bolt) is inserted into a vertical hole extending vertically across the slit, from a counterbore of the vertical hole provided at an upper surface side of the holder (corresponding to a rake-face side of the insert); the threaded member is screwed into a threaded hole (an internal thread portion) of the vertical hole provided in a region under the slit; and as a result of the threaded member being tightened, the head of the threaded member presses a seat (bearing surface of the counterbore) located at the bottom of the vertical hole, whereby the upper law is elastically deformed by a very small amount toward the lower law, thereby clamping the cutting insert held between the laws.

Meanwhile, in cutting a metal material by use of such a cutting tool (hereinafter, may be called merely a tool), during the cutting, coolant (cutting liquid such as cutting oil or cutting water) is usually supplied (sprayed) over a cutting edge of the insert for cooling and lubricating a cut part of the metal material and for extending the life of the cutting edge. Regarding supply of coolant to the above-mentioned cutting tools for use in cutting off and grooving, there have been proposed various techniques for providing an internal coolant supply channel in the cutting tool holder of the cutting tool and providing a discharge opening of the internal coolant supply channel at the front end of the holder or in the vicinity of the front end for supplying coolant to the cutting edge instead of externally supplying coolant to the cutting edge (see, for example, Patent Document 1).

According to the technique described in Patent Document 1, a tunnel-shaped channel (hereinafter, called an internal upper-jaw channel) for supplying coolant is provided in the upper jaw (upper-jaw region) which presses the rake-face side of the insert. In this technique, the coolant is supplied to the internal upper-jaw channel by utilizing the interior of the threaded member having a head adapted to elastically deform the upper law through the slit for clamping the insert as mentioned above. Specifically, the following structure is employed.

According to the technique described in Patent Document 1, an inlet of the internal upper-jaw channel opens at the inner circumferential surface of the vertical hole adapted to allow insertion of the above-mentioned clamping threaded member, and is provided in a region of the holder located above the slit. A coolant introduction path is provided below the bottom of the threaded hole in a region under the slit, for introducing coolant from outside (external piping). A threaded shaft (external thread portion) of the threaded member having a head has a hollow which opens at the front end and is closed at the rear end by the head (hollow shaft); the threaded shaft has a branch hole extending, through a region located toward the head, from the hollow to an outer circumferential surface; in a state of the threaded shaft being screwed into the threaded hole, the branch hole and the internal upper-jaw channel communicate with each other; as a result, coolant introduced from outside to the bottom of the threaded hole through the introduction path is fed to the inlet of the internal upper-jaw channel through the hollow and the branch hole of the threaded member, flows through the internal upper-jaw channel, and is then discharged from the discharge opening provided at the front end of the upper jaw toward the cutting edge of the insert on the rake-face side.

PRIOR ART DOCUMENT

Patent Document

Patent Document 1: Japanese Patent Application Laid-Open (kokai) No. 2012-183634

SUMMARY OF THE INVENTION

Problem to be Solved by the Invention

However, in the cutting tool holder having the above-mentioned coolant channel structure, the coolant channel structure requires disposition of an elastic seal (O-ring packing made of rubber) around the outer circumference of the threaded member. Specifically, the elastic seal must be disposed between the outer circumferential surface of the threaded shaft and the inner circumferential surface of a portion of the vertical hole adapted to allow insertion of the threaded shaft and provided in a region above the slit (a portion of the vertical hole located under the bearing surface of the counterbore), at a position located toward the slit in relation to the branch hole (inlet of the internal upper-jaw channel). This is for the following reason: as a result of the threaded member being tightened, a forwardly facing surface of the head of the threaded member is pressed against and comes into close contact with the bearing surface of the counterbore, thereby providing a seal at the head side of the threaded member; however, since an appropriate gap is present between the outer circumferential surface of the threaded shaft and the inner circumferential surface of the vertical hole adapted to allow insertion of the threaded shaft (a portion of the vertical hole located under the bearing surface of the counterbore), such a seal must be disposed therebetween; otherwise, coolant flows out (leaks) toward the slit.

The cutting tool holder having the above-mentioned coolant channel structure requires such a seal; accordingly, the number of components of the cutting tool increases, and the structure of the cutting tool becomes complicated. Further, since the seal is made of a rubber-like elastic material, deterioration in sealing performance caused by aging degradation is unavoidable, and sudden leakage may occur. Additionally, in supply of coolant under high pressure, the seal encounters difficulty in stability, and, in some cases, detachment of the seal has occurred in the course of use over a long period of time. Also, in the cutting tool using the cutting tool holder having the above-mentioned coolant channel structure, since the coolant channel is provided within the upper law only, supply of coolant is limited to supply from the rake-face side, and coolant cannot be supplied to the cutting edge from a flank side.

An object of the present invention is to provide a cutting tool in which a threaded member having a head is disposed in such a manner as to extend across a slit and is tightened for clamping, an insert held between an upper jaw and a lower jaw, as well as a cutting tool holder in which a threaded shaft of the threaded member has a hollow for forming a coolant channel, the cutting tool and the cutting tool holder allowing formation of the coolant channel without need to use a seal member such as a rubber O-ring packing, and allowing supply of coolant from the rake-face side and from the flank side.

Means for Solving the Problem

In accordance with a first aspect of the present invention, a cutting tool holder includes an upper jaw and a lower jaw protruding frontward and allowing a cutting insert to be held therebetween at a front end of the holder, has a slit extending rearward of a space between the two jaws, and forms a cutting tool through clamping of the cutting insert held between the two jaws by screwing in and tightening a threaded member having a head, which is disposed in a vertical hole extending vertically across the slit, to thereby elastically deform the upper jaw toward the lower jaw. The upper jaw and the lower jaw have a tunnel-shaped internal upper-law channel and a tunnel-shaped internal lower-jaw channel, respectively, each having a discharge opening for supplying coolant toward a cutting edge cutting insert to be clamped. The vertical hole extends vertically through the holder. A portion of the vertical hole extending from a lower surface of the holder toward the slit has a large-diameter hole having an inside diameter greater than an outside diameter of the head of the threaded member and serving as an opening for supplying the coolant, a small-diameter hole extending from a bottom of the large-diameter hole through a bearing surface, smaller in diameter than the large-diameter hole, and allowing clearance fit of a threaded shaft of the threaded member, and an inlet of the internal lower-jaw channel provided in the large-diameter hole. A portion of the vertical hole extending from the slit toward an upper surface of the holder has a threaded hole threadingly engaged with the threaded shaft of the threaded member, and an inlet of the internal upper-jaw channel provided on an inner circumferential surface of the threaded hole at a vertically intermediate position. The threaded member has a closed-bottomed hollow which is open at a center of a rear end surface of the head and extends toward a front end of the threaded shaft, and a branch hole which is located at an intermediate position in a front-rear direction of the threaded shaft and through which the hollow communicates with an outer circumferential surface of the threaded shaft. The threaded member is inserted from the large-diameter hole, the threaded shaft is screwed into the threaded hole until a front surface of the head is seated on the bearing surface located at a bottom of the large-diameter hole, and a recess is formed in at least one of the inner circumferential surface of the threaded hole and the outer circumferential surface of the threaded shaft for establishing communication between the internal upper-jaw channel and the branch hole when the cutting insert is clamped. The threaded shaft has a screw-driving portion at its front end for allowing tightening and loosening of the threaded shaft from a front-end side thereof.

In one embodiment, a thread of the threaded member is a left-hand thread. In other embodiments, the head of the threaded member is formed such that at least a portion located toward its rear end reduces in outside diameter toward the rear end.

In yet other embodiments, in a view of the cutting tool holder from an upper-surface side, the internal upper-jaw channel and the inlet thereof extend in a front-rear direction of the holder along a tangent to the inner circumferential surface of the threaded hole, and the internal lower-jaw channel and the inlet thereof extend in the front-rear direction along a tangent to an inner circumferential surface of the large-diameter hole.

In still yet other embodiments, a front end of the lower jaw protrudes frontward of a front end of a cutting-insert support surface of the upper jaw, and the front end of the lower jaw is formed such that a portion of the lower jaw located downward of an upper surface of the lower jaw serving as a cutting-insert support surface protrudes frontward in relation to the upper surface of the lower law.

According to another aspect of the invention, a cutting tool includes a cutting insert inserted between the upper jaw and the lower jaw of the cutting tool holder described above and is clamped by screwing and tightening the threaded member.

Effects of the Invention

The cutting tool holder of the first aspect of the present invention forms the cutting tool through clamping of the insert held between the upper jaw and the lower law by screwing the threaded member having a head disposed in such a manner as to extend across the slit, and, even though the threaded shaft of the threaded member employs a hollow structure for forming a coolant channel, without need to employ a seal as in the case of a conventional technique, the above structure allows coolant fed to the large-diameter hole to flow through the internal lower-jaw channel and through the hollow and the branch hole of the threaded member and the internal upper-jaw channel and to be supplied from the discharge openings of the internal lower-law and upper-jaw channels. Therefore, coolant can be supplied toward the cutting edge of the cutting insert from both of the rake-face side and the flank side.

Specifically, by virtue of the above structure, in supply of coolant to the internal lower-jaw channel, coolant fed to the large-diameter hole flows to the internal lower-jaw channel from the inlet (opening) provided in the large-diameter hole; in this connection, since the front surface of the head of the threaded member is seated on and comes into close contact with the bearing surface located at the bottom of the large-diameter hole (the bearing surface at the boundary between the large-diameter hole and the small-diameter hole) to thereby provide a seal at the seated portion, leakage toward the slit is prevented. In supply of coolant to the internal upper-jaw channel, coolant fed to the large-diameter hole flows through the hollow and the branch hole of the threaded member and to the internal upper-jaw channel from the inlet provided at the inner circumferential surface of the threaded hole and communicating with the branch hole. At this time, an outer circumferential surface in a front-rear direction of the branch hole provided in the threaded shaft of the threaded member comes into contact with the inner circumferential surface of the threaded hole. That is, since the outer circumferential surface in the front-rear direction of the branch hole provided in the threaded shaft comes into spirally close contact with; i.e., engages in a thread fit (fit between thread ridge and thread root) with, the thread of the threaded hole as a result of screw tightening, the presence of a gap at the contact portion can be substantially prevented; therefore, there can be substantially prevented leakage of coolant from the branch hole toward the slit located underneath or toward the upper surface of the upper law.

In this manner, according to the cutting tool holder of the present invention, its structure can prevent leakage of coolant without need to use an elastic seal such as a rubber O-ring packing used in conventional practice; thus, coolant is supplied as desired without an increase in the number of components and complication of structure. Further, since the cutting tool allows supply of coolant to the cutting edge from both of the upper-jaw side and the lower-jaw side, cutting performance is improved, and the cutting edge is extended in service life.

In accordance with the first aspect of the invention, the bearing surface which is located at the bottom of the large-diameter hole and on which the front surface of the head of the threaded member is seated may be a flat surface or a taper surface. An appropriate shape may be imparted to the bearing surface so as to provide a high degree of sealing in response to the shape of the front surface of the head. For example, when the front surface of the head has a "countersunk" shape, the bearing surface preferably has a taper surface that can come into close contact with the front surface. In order to establish communication between the branch hole of the threaded shaft and the inlet of the internal upper-jaw channel opening at the inner circumferential surface of the threaded hole, the recess may be formed in at least one of the inner circumferential surface of the threaded hole and the outer circumferential surface of the threaded shaft in such a manner as to establish communication between the internal upper-jaw channel and the branch hole in clamping the cutting insert with the front surface of the head of the threaded member being seated on the bearing surface located at the bottom of the large-diameter hole as a result of the threaded member being screwed into the threaded hole, and the recess may assume the form of a circumferentially annular groove formed in at least one of the inner circumferential surface of the threaded hole and the outer circumferential surface of the threaded shaft at a position where the inlet of the internal upper-jaw channel and the branch hole of the threaded shaft at least partially overlie each other in the front-rear direction. In order to reduce pressure drop of coolant and enhance fluidity of coolant, preferably, the number of bends is reduced, and the internal upper-jaw channel and the internal lower-jaw channel extend in straight lines to the greatest possible extent.

The thread of the threaded member may be a right-hand thread (ordinary thread), but, as in the case of the embodiment described above, the thread of the threaded member may be a left-hand thread. In the cutting tool holder of the present invention, at the stage of assembly, the threaded member can be screwed in by turning its head. However, in ordinary use (cutting work, etc.) after assembly, since the large-diameter hole in which the head is present serves as a coolant supply opening (opening of connection to an external pipe for supply of coolant), the head cannot be turned unless the external pipe is disconnected. By contrast, according to the present invention, since the threaded shaft of the threaded member has a screw-driving portion at its front end for allowing tightening and loosening of the threaded shaft from the front-end side, the threaded shaft can be turned without need to disconnect the external pipe.

In the case where the threaded member having an ordinary right-hand thread is screwed into the threaded hole of the holder and tightened, the two jaws are fastened (clamped) together by turning the front-end side of the threaded shaft counterclockwise. By contrast, the employment of left-hand thread allows clamping of the two laws by clockwise turning as in the case of ordinary screw drifting. In this manner, the employment of left-hand thread prevents erroneous operation in clamping and allows clamping and unclamping in a manner similar to that of turning a right-handed screw. Even though the threaded member employs an ordinary right-hand thread, no problem will arise if it (the two jaws are clamped together by counterclockwise turning) is specified by engraved marking or the like on, for example, the upper surface side of the upper jaw; however, the employment of left-hand thread eliminates such need to specify. The screw-driving portion (screw-turning portion) in the front end of the threaded shaft may assume the form of, for example, a polygonal hole such as a hexagonal hole, a cross hole, slitting, or a screw-turning polygonal projection having an outside diameter smaller than the root diameter of the thread.

Since screw driving can be performed on the front-end side of the threaded shaft as mentioned above, the head of the threaded member does not need to have a polygonal shape and may have a shape having a fixed outside diameter along the front-rear direction (thickness direction) (e.g., a circular columnar shape); however, preferably, as described preferably, as described above, the head of the threaded member may be formed such that at least a portion located toward its rear end reduces in outside diameter toward the rear end. For the structural reason of the present invention, the head of the threaded member is accommodated within the large-diameter hole; accordingly, from the viewpoint of space saving of the large-diameter hole, the outside diameter and the thickness (dimension in the front-rear direction) of the head need to be reduced to the greatest possible extent. Further, the large diameter hole serves as a coolant supply opening (opening for connection to an external pipe); accordingly, a threaded hole for piping (e.g., taper pipe thread (internal thread)) is formed on the inner circumferential surface of the large-diameter hole. In order to avoid interference with an operation of screwing a pipe fitting (male fitting) or the like into the threaded hole, the inlet of the internal lower-jaw channel needs to open at the bottom side of the large-diameter hole (position near the bearing surface). In this case, by means of a rear portion of the head having a taper shape such that the diameter reduces toward the rear end as above, a large coolant channel (channel space) can be secured in the vicinity of the inlet of the internal lower-law channel, whereby a flow of coolant into the internal lower-jaw channel is smoothed.

Preferably, in plan view (view of the holder from the upper-surface (upper-jaw) side), the inlet of the internal upper-jaw channel and the inlet of the internal lower-jaw channel extend in a direction tangent to the outer circumference of the threaded member. Since such arrangement of the inlets allows the inlets to be elongated in the front-rear direction and thus to increase in size, a flow of coolant into the internal upper-law channel and the internal lower-jaw channel is smoothed. That is, preferably, as described above, in a view of the cutting tool holder from the upper-surface side, the internal upper-jaw channel and the inlet thereof extend in the front-rear direction of the holder along a tangent to the inner circumferential surface of the threaded hole, and the internal lower-jaw channel and the inlet thereof extend in the front-rear direction along a tangent to the inner circumferential surface of the large-diameter hole.

The cutting tool of the present invention is preferred for use in cutting off or grooving, but is not limited thereto. In the case of a cutting-off tool, the width of a cutting edge (width of a rake face) is narrow; accordingly, the upper jaw and the lower jaw of the holder are narrow in width and relatively increase in front-rear length (protruding length). Further, in the present invention, since the two jaws have respective internal spaces corresponding to the internal lower-jaw channel and the internal upper-jaw channel, particularly, the lower jaw which receives a main component force in cutting is apt to suffer deterioration in strength and rigidity and is thus apt to generate chattering. Therefore, in order to increase the rigidity of the lower jaw, the lower jaw is preferably increased in vertical dimension to the greatest possible extent within a range not to interfere with a workpiece in cutting. Also, preferably, the front end of the lower jaw protrudes frontward of the front end of a cutting-insert support surface of the upper jaw, and the front end of the lower jaw is formed such that a portion of the lower jaw located downward of the upper surface of the lower jaw serving as a cutting-insert support surface protrudes frontward. The employment of such a structure improves rigidity of the lower jaw and allows determination of the position and direction of a coolant discharge opening for direct supply of coolant to the cutting edge on the flank side under good conditions. That is, the employment of such a structure allows, in addition to improvement of rigidity of the lower jaw, determination of the position and direction (flow direction) of the discharge opening of the internal lower-jaw channel for efficiently spraying, coolant discharged from the discharge opening over the cutting edge on the flank side without hindrance by the lower surface of the cutting insert.

MODES FOR CARRYING OUT THE INVENTION

Figure 1:
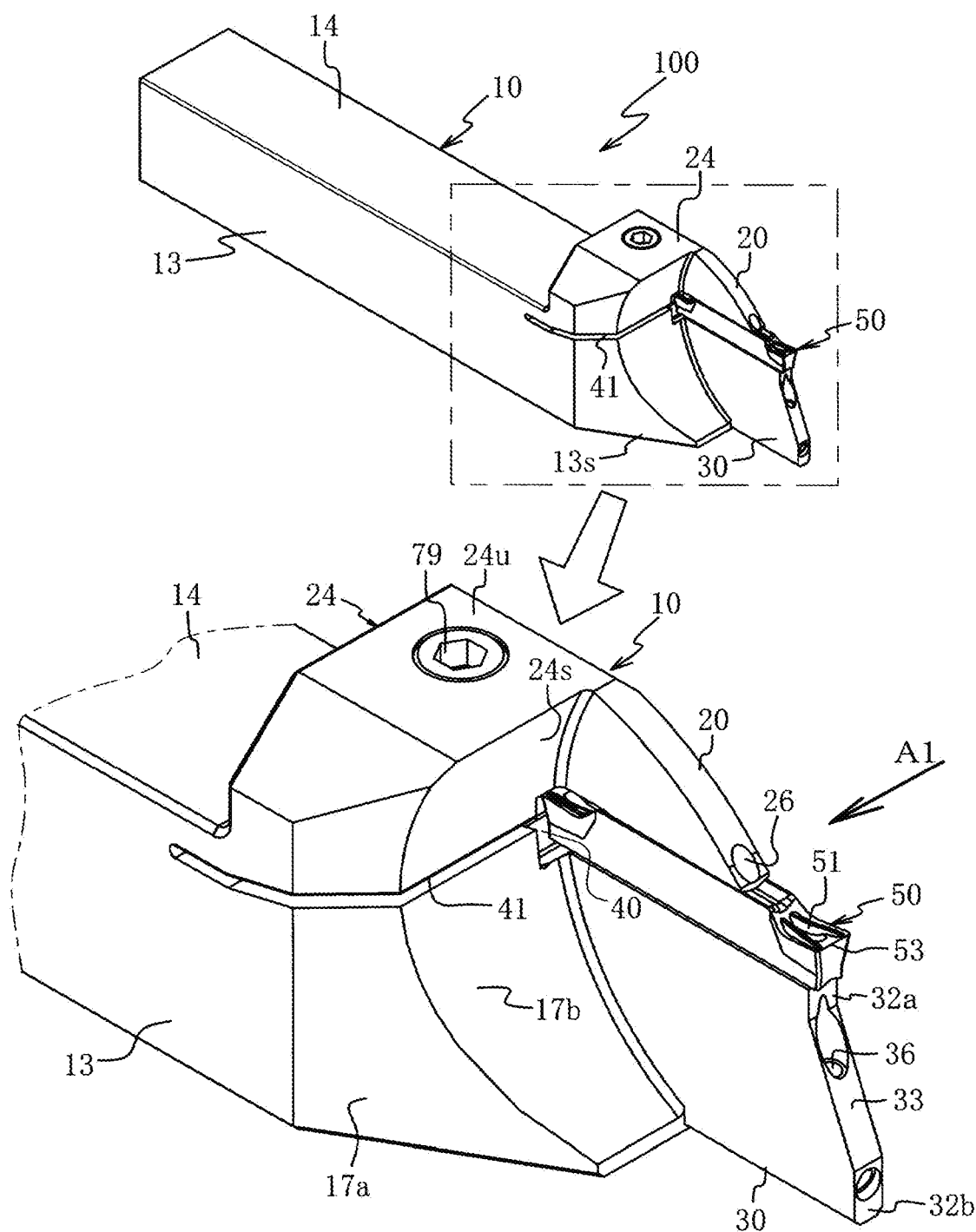
FIG. 1 Perspective view of a first embodiment example of a cutting tool according to the present invention and an enlarged view of an essential portion (front end portion) of the cutting tool.
Figure 2:
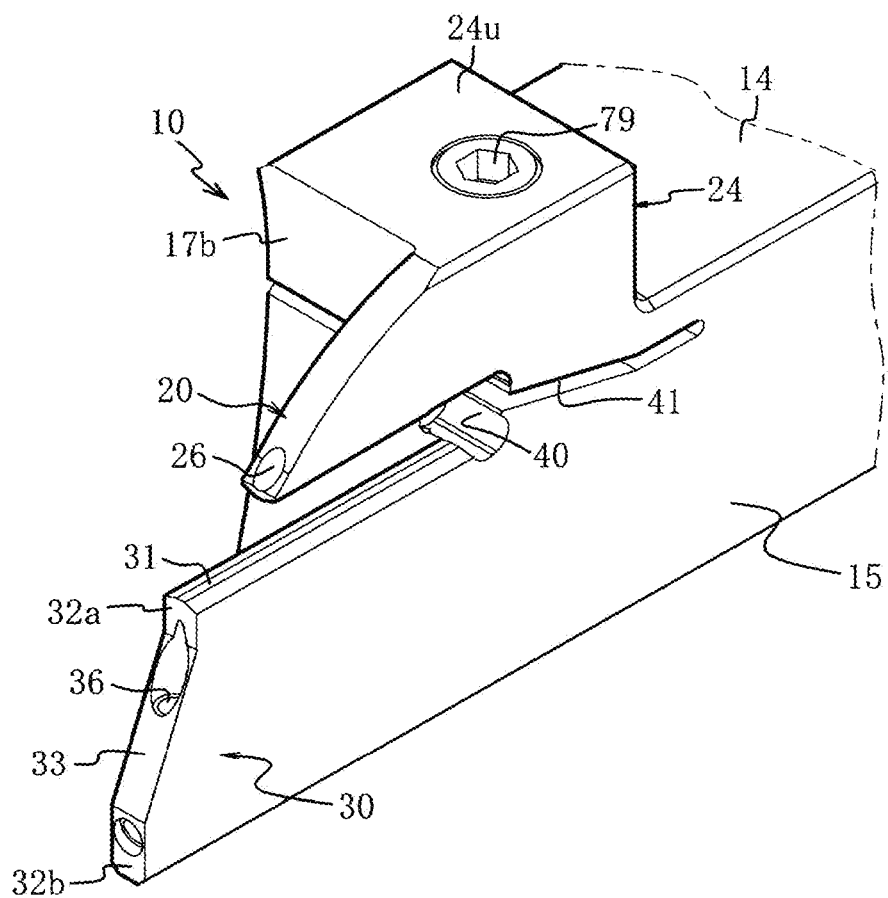
FIG. 2 Perspective view of an essential portion (front end portion) of a holder after removal of a cutting insert from the cutting tool in FIG. 1 as viewed from arrow A1 of FIG. 1.

An embodiment example (first embodiment example) of the present invention will be described detail with reference to FIGS. 1 to 9. As shown in FIG. 1, etc., a cutting tool 100 of the present example has an upper law 20 and a lower jaw 30 which protrude frontward at one side of a front end 13s of a bar-shaped (rectangular-bar-shaped) shank 13 of a holder 10. The holder 10 has a slit 41 cut rearward from a wall 40 located rearward of a space between the two jaws 20 and 30, and a cutting insert 50 is held and clamped between the two jaws 20 and 30. The cutting tool 100 of the present example is used to perform cutting off, and, for the reason of such machining application, in plan view (the holder 10 is viewed from an upper surface (upper jaw 20) 14 side), the upper jaw 20 and the lower jaw 30 protrude along one side surface (located toward a spindle head of a lathe) 15 with respect to a width direction of the holder 10 while having an approximately fixed thinness corresponding to a cutting-off width (see FIGS. 2, 3-B, etc.). The cutting insert 50 is of a dog bone type; specifically, in view from a common rake face 51 side, the cutting insert 50 has cutting edges 53 at opposite ends, the rake faces 51 and a lower surface 54 located opposite the rake faces 51 are in parallel, and the opposite cutting edges 53 have a relatively wide width.

Figure 3:
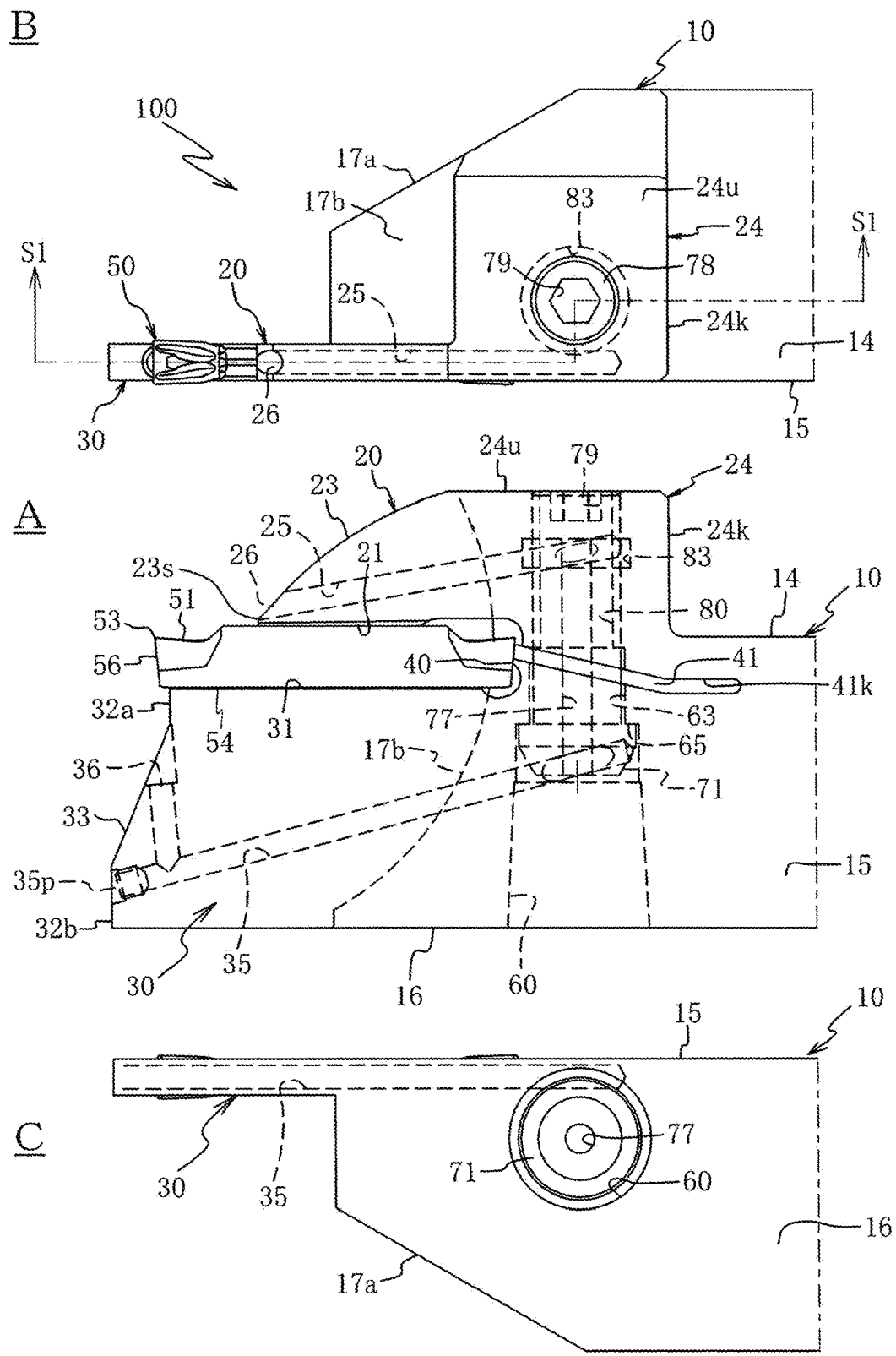
FIG. 3 A is a side view of an essential portion (front end portion) of the cutting tool of FIG. 1 as viewed from arrow A1 of FIG. 1, B is a plan view of A, and C is a bottom view of A.
Figure 4:
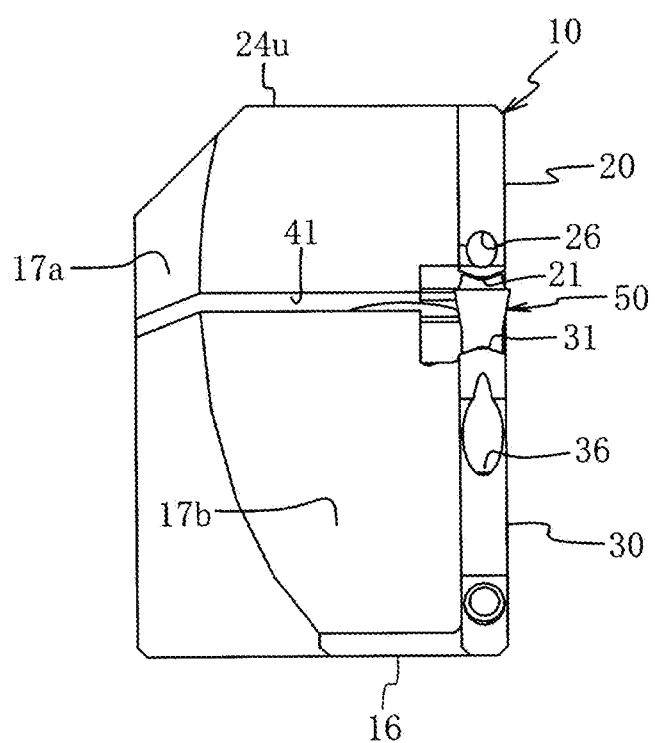
FIG. 4 Left-hand view of FIG. 3-A.

In the lower jaw 30, its upper surface (support surface for the lower surface 54 of the insert 50) 31 is in parallel with and lower in level than the upper surface 14 of the holder 10; the lower surface of the lower jaw 30 is flush with a lower surface 16 of the holder 10; and the entire lower jaw 30 protrudes frontward at the front end 13s of the shank 13 (see FIGS. 3-B, 5, etc.). An intermediate portion of the front end of the lower jaw 30, excluding an upper end portion 32a and a lower end portion 32b thereof has a sloped surface 33 such that a lower part of the intermediate portion protrudes in relation to an upper part thereof. The front end of the lower jaw 30 is formed in such a manner that a portion of the lower jaw 30 located downward of the upper surface 31 serving as a cutting-insert support surface protrudes frontward in relation to the upper surface 31. As will be described later in detail, a coolant discharge opening 36 of an internal lower-jaw channel 35 provided in the lower jaw 30 in the form of a tunnel is provided along the sloped surface 33 in such a manner as to face upward and be inclined slightly frontward.

In the upper jaw 20, its lower surface (support surface for the upper surface (on the rake face 51 side) of the insert 50) 21 is approximately in parallel with and equivalent or slightly higher in level than the upper surface 14 of the holder 10 (see FIGS. 3-B, 5, etc.). An upper surface 23 of the upper jaw 20 bulges upward above the upper surface 14 of the holder 10 and protrudes frontward from a front end 24s of an upper-jaw proximal portion 24 formed in such a manner as to bulge upward in the form of a block integrally with and above the front end 13s of the shank 13 of the holder 10. The upper surface 23 of the upper jaw 20 is formed in such a manner as to slope downward toward a front end 23s thereof; and, as will be described later in detail, a coolant discharge opening 26 or an internal upper-jaw channel 25 provided in the upper jaw 20 in the form of a tunnel is provided in a region of the upper surface 23 located toward the front end 23s in such a manner as to extend frontward in an obliquely downward manner. The front end 23s of the lower surface 21 of the upper jaw 20 is located rearward of the front end of the upper surface 31 of the lower jaw 30 (the upper end portion 32a of the lower jaw 30); i.e., the lower jaw 30 protrudes frontward of the upper jaw 20.

The sift 41 is cut at a vertically intermediate position of the wall 40 located rearward of a space between the upper jaw 20 and the lower jaw 30 and extends rearward of the upper and lower jaws and of a rear end 24k of the upper-jaw proximal portion 24 to have, in the present example, a depth equivalent to the protruding length of the upper jaw 20, and along the entire width of the shank 13 such that a portion of the holder 10 located toward the upper surface 14 (and toward the front end 13s of the shank 13) becomes relatively thin-walled. The space between the upper jaw 20 and the lower jaw 30 allows insertion of the insert 50 in a free state without leaving no gap; by virtue of presence of the slit 41, when the insert 50 is clamped, the upper jaw 20 elastically deforms, or bends, slightly toward the lower law 30 without the lower law 30 being deformed. The slit 41 excluding a rear end portion. 41k thereof extends rearward at an appropriate angle of a downward slope from the wall 40 located rearward of the space between the upper jaw 20 and the lower jaw 30. At the front end of the holder 10 (a portion located toward the front end 13s of the shank 13), in plan view, the front end portion is cut obliquely at the side opposite the upper jaw 20 and the lower jaw 30, and a surface between a resultant cut surface 17a and the upper jaw 20 and the lower jaw 30 including the front end 24s of the upper-jaw proximal portion 24 is concavely formed into an arc surface 17b so as to avoid interference with the outside diameter (outer circumferential stir trace) of a round bar that is undergoing cutting off.

Next will be described sequentially the structure in which the cutting insert 50 disposed between the upper jaw 20 and the lower jaw 30 is clamped through elastic deformation of the upper jaw 20 toward the lower jaw 30 by screwing in a threaded member 70 having a head disposed in such a manner as to extend across the slit 41, the structure of the threaded member 70 used for clamping, the structure of coolant channels (internal lower-law channel 35 and internal upper-jaw channel 25) provided in the jaws 20 and 30, etc.

The above-mentioned holder 10 has a large-diameter hole 60 formed in a region located rearward of the proximal end (root of protrusion) of the lower jaw 30, located, in plan view, slightly toward the front end of the slit 41, and biased towards the lower jaw 30 side (see FIGS. 3-A and 3-B), and the large-diameter hole 60 extends from the lower surface 16 of the holder 10 toward the upper law 20 to the vicinity of the slit 41 and has an inside diameter greater than the outside diameter of a head 71 of the threaded member 70 having a head. The holder 10 has a small-diameter hole 63 extending coaxially with the large-diameter hole 60 toward the upper jaw 20 from the bottom of the large-diameter hole 60, being smaller in size than the large-diameter hole 60, and allowing clearance fit of a threaded shaft 73 of the threaded member 70; i.e., the holder 10 has the large-diameter and small-diameter vertical holes having circular cross sections, respectively, in the upward direction. The boundary (downward surface) between the bottom of the large-diameter hole 60 and the small-diameter hole 63 is a bearing surface (flat annular bearing surface) 65 on which a frontward surface 72 of the head 71 of the threaded member 70 is seated in screwing the threaded member 70 into a threaded hole 80 provided at the upper jaw 20 side and to be described next (see FIGS. 5, 6, etc.). Notably, the large-diameter hole 60 allows connection of an end portion of a pipe for supplying coolant from outside the cutting tool 100 and has, for example, a thread for connection to the pipe, formed in a region of its inner circumferential surface located toward its opening.

Figure 5:
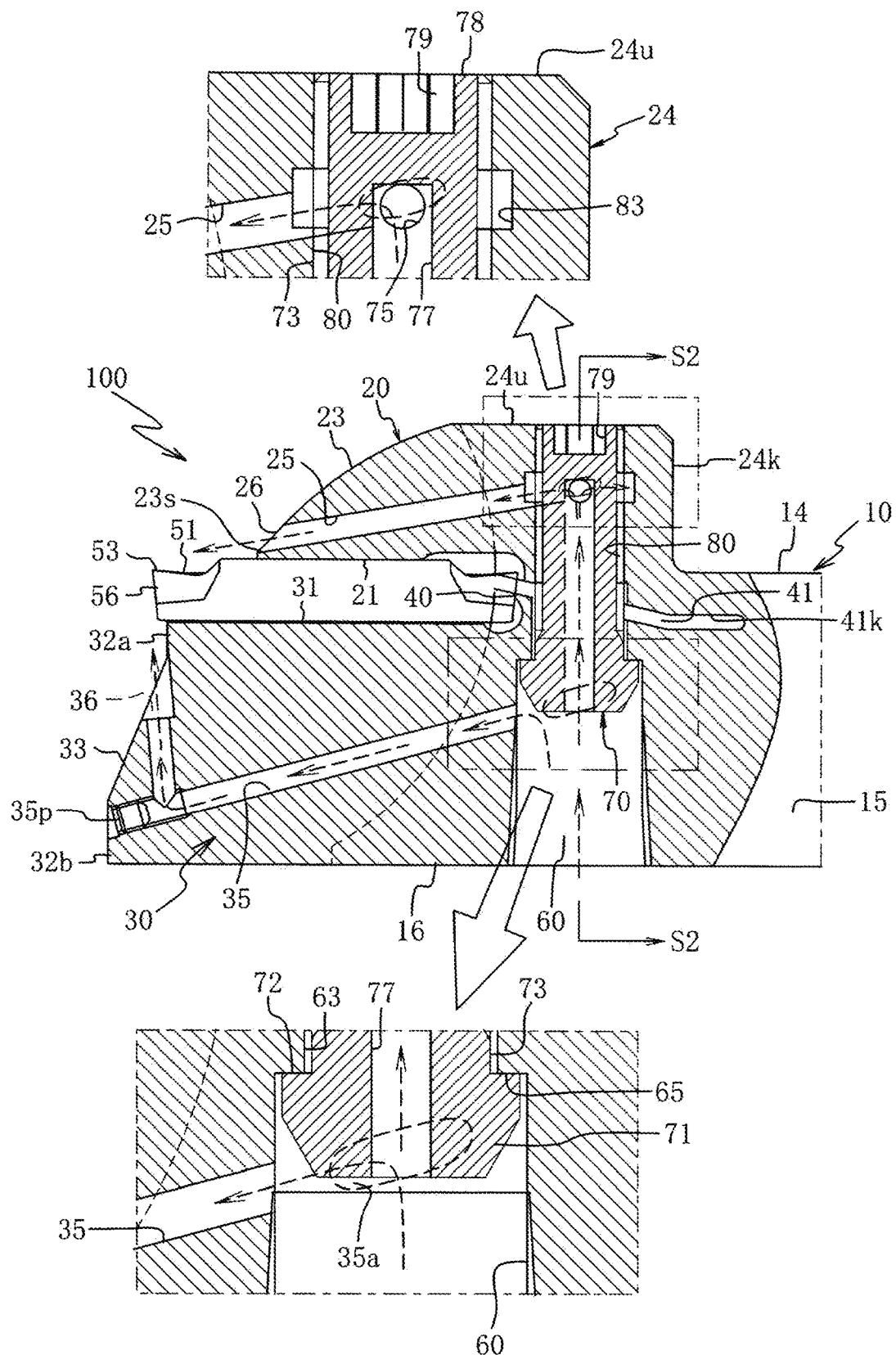
FIG. 5 Sectional view taken along line S1-S1 of FIG. 3-B, and enlarged views of portions thereof.
Figure 6:
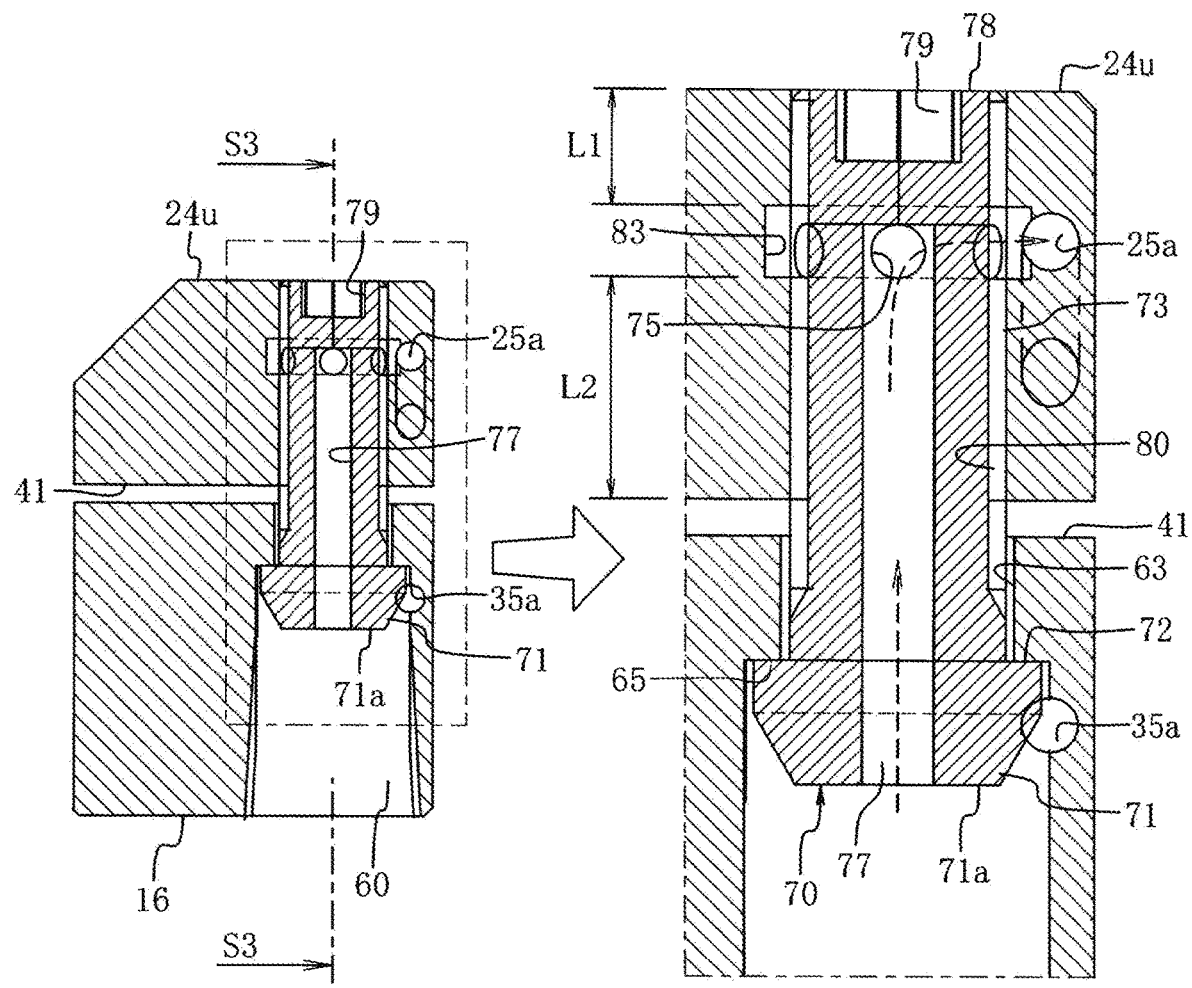
FIG. 6 Sectional view taken along line S2-S2 of FIG. 5, and an enlarged view of a portion thereof.
Figure 7:
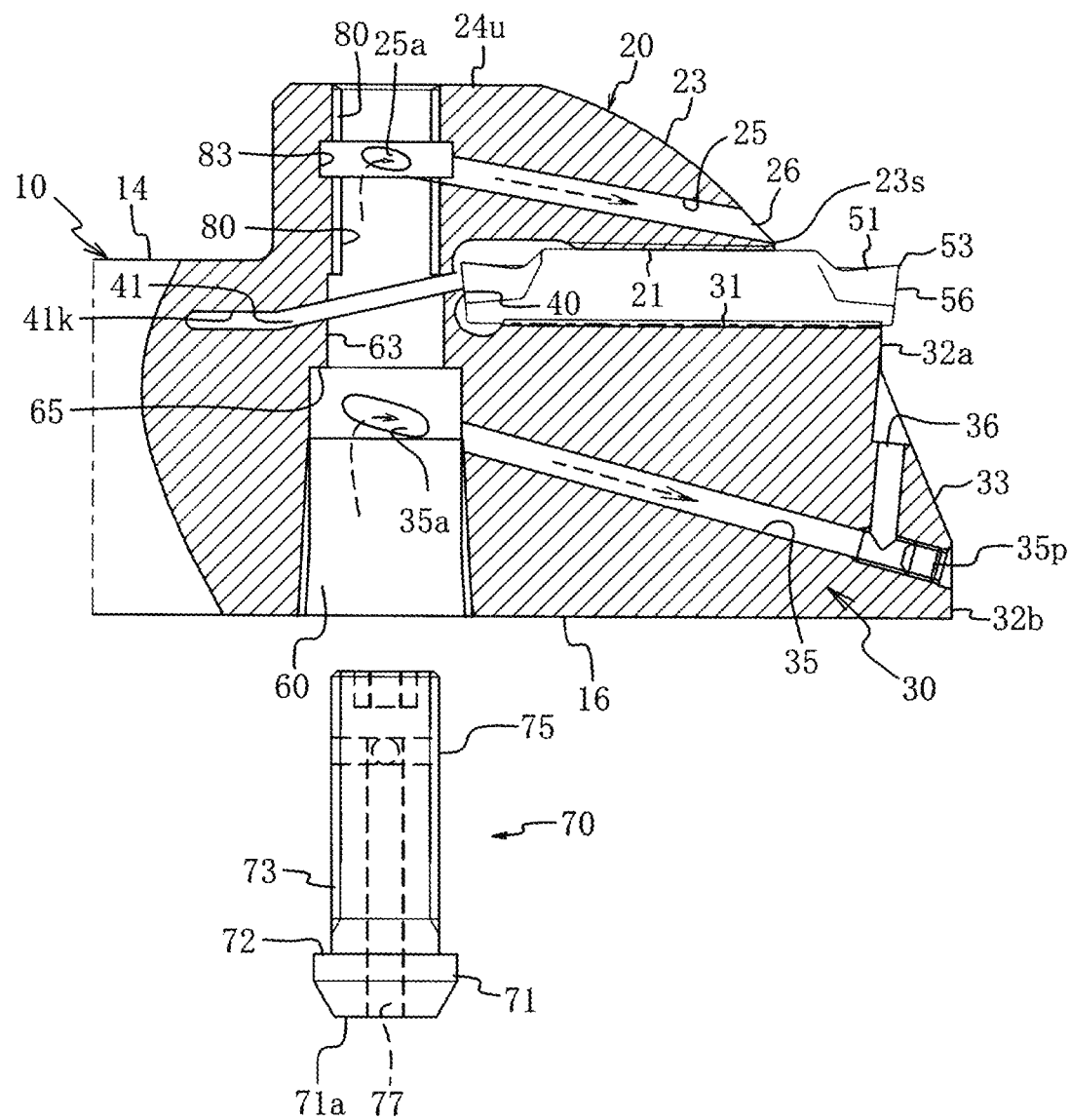
FIG. 7 Sectional view taken along line S3-S3 of FIG. 6 with a threaded member removed.
Figure 8:
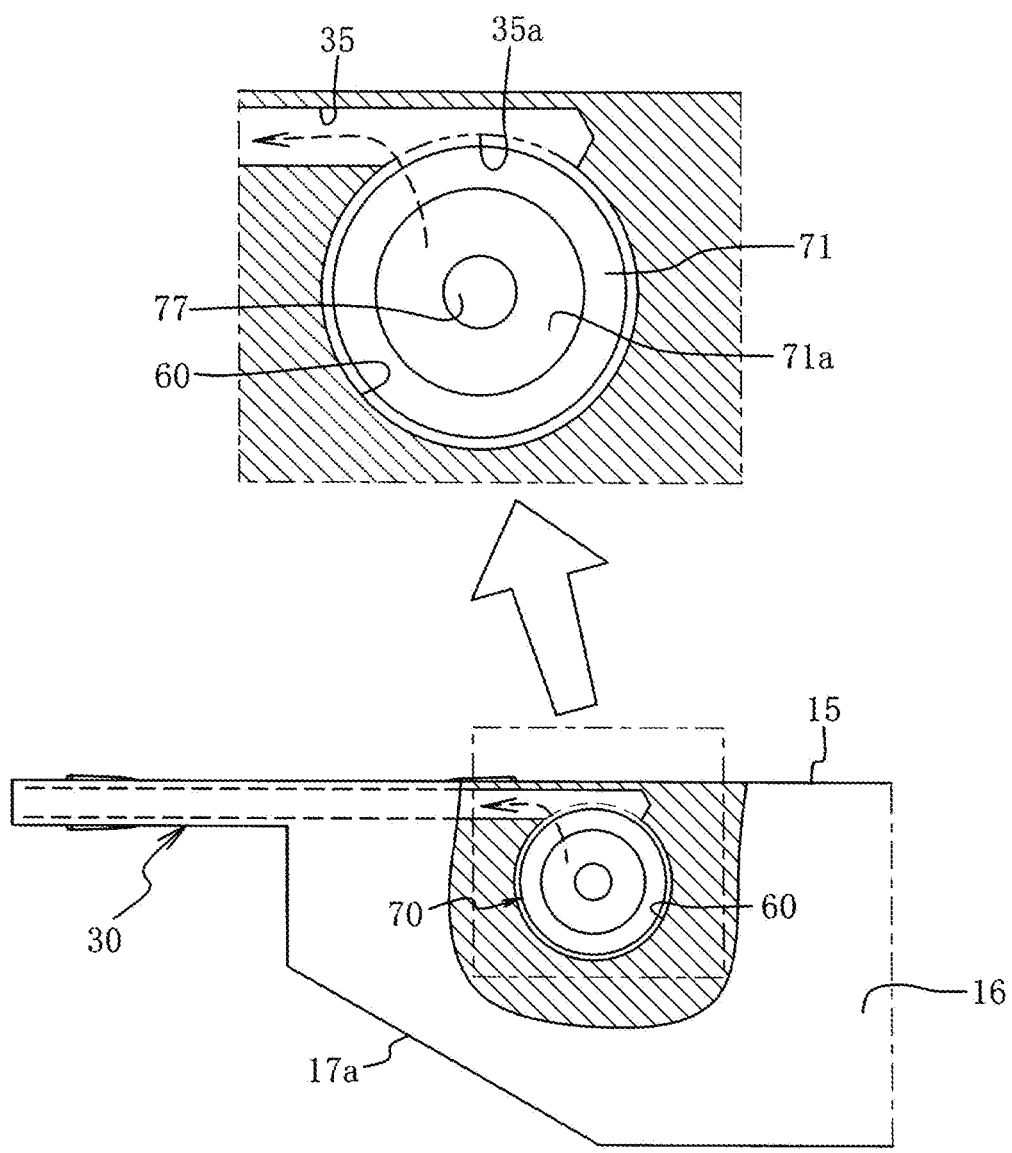
FIG. 8 Partially cutaway view of FIG. 3-C, and an enlarged view of a portion thereof.
Figure 9:
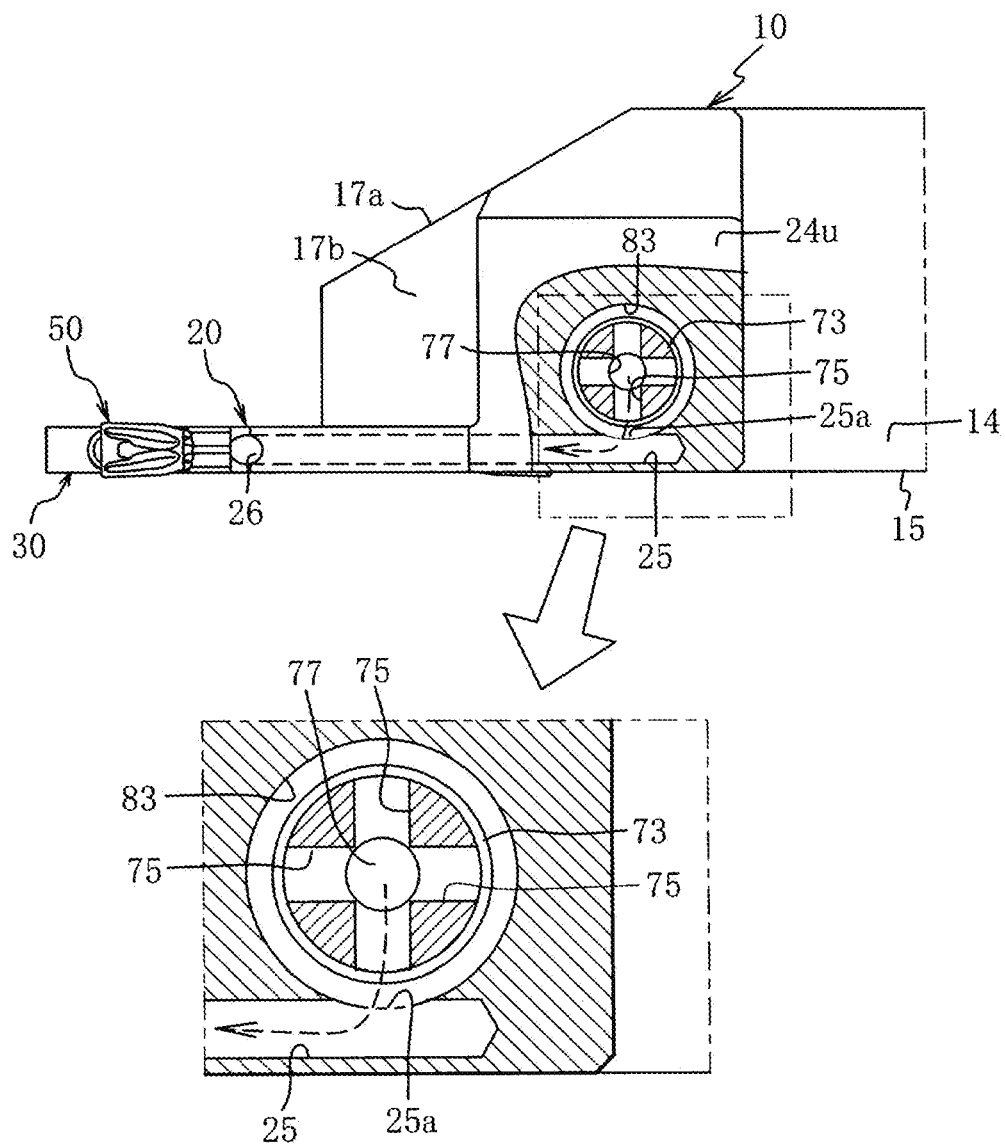
FIG. 9 Partially cutaway view of FIG. 3-B, and an enlarged view of a portion thereof.

The inner circumferential surface of the large-diameter hole 60 has an inlet 35a of the above-mentioned internal lower-jaw channel 35 (an inlet communicating with the internal lower-jaw channel 35) provided in a region located toward the bearing surface (small-diameter hole 63) 65 (see FIGS. 5 to 7, etc.). In plan view, since the lower jaw 30 protrudes along one side (one side surface) 15 of the holder 10, the inlet 35a of the internal lower-jaw channel 35 extending in the protruding direction of the lower jaw 30 opens at the inner circumferential surface of the large-diameter hole 60 in such a manner as to extend in the direction of a tangent to the inner circumferential surface at the same side as the lower jaw 30, and communicates with the large-diameter hole 60; accordingly, the inlet 35a communicating with the large-diameter hole 60 assumes the form of an elongated hole, thereby securing a large flow passage area (see FIGS. 5, 7, 8, etc.). In order to enhance strength and rigidity of the lower jaw 30 against a main component force in cutting (cutting off), the lower jaw 30 has a large vertical height, but is small in thickness (width in cutting direction) so as to correspond to width of cutting off. Accordingly, the internal lower-jaw channel 35 has a small circular (channel) cross section having a diameter of, for example, 1 mm to 2 mm in the lower jaw 30. In the present example, the internal lower-jaw channel 35 extends straight from its inlet 35a toward the lower end portion 32b of the front end of the lower jaw 30 in a downward sloping, manner, turns upward in a direction slightly inclined frontward at a portion located toward its front end closed with a plug 35p, extends straight along the sloped surface 33 of the front end of the lower law 30, and opens at the discharge opening 36 located in an upper portion of the front end. The inlet 35a in the form of an elongated hole communicating with the large-diameter hole 60 is also sloped in correspondence with the downward slope of the internal lower-jaw channel 35 (see FIGS. 5, 7, 8, etc.).

In the present example, coolant discharged from the discharge opening 36 is sprayed toward the cutting edge 53 (cutting portion) along a front flank 56 of the clamped insert 50. In the present example, the internal lower-jaw channel 35 slopes downward straight from the inlet 35a such that the dimension between the upper surface (support surface for the insert 50) 31 of the lower jaw 30 and the internal lower-jaw channel (hole) 35 increases frontward. Further, since the discharge opening 36 is provided in a frontward region free from direct imposition of a main component force, the lower jaw 30 is enhanced in rigidity. As will be understood, from the viewpoint of rigidity of the lower jaw 30, the inlet 35a of the internal lower-jaw channel 35 is also provided preferably in a rather lower region of the lower jaw 30.

Meanwhile, the upper-jaw proximal portion 24 of the holder 10 has the threaded hole 80 which is formed therethrough from its lower surface (surface of the slit 41) toward its upper surface 24u coaxially with the vertical holes on the lower jaw 30 side (the large-diameter hole 60 and the small-diameter hole 63) and into which the threaded shaft 73 of the threaded member 70 having the head 71 and used for clamping is screwed (see FIGS. 5 to 7, etc.). The upper-law proximal portion 24 also has an inlet (inlet of the internal upper-jaw channel 25) 25a communicating with the above-mentioned internal upper-jaw channel 25 at a vertically intermediate position (in the present example, slightly above the center) of the threaded hole 80. An annular groove (groove having the form of a ring) 83 having, a predetermined vertical width and a diameter greater than the inside diameter (root diameter) of the threaded hole 80 is provided in the inner circumferential surface of the threaded hole 80 at a vertically intermediate position corresponding to the inlet 25a. The internal upper-jaw channel 25 extends obliquely downward in the form of a straight line toward a front end region of the upper jaw 20, and, in plan view, the inlet 25a of the internal upper-jaw channel 25 communicates with and opens at the annular groove 83 of the inner circumferential surface of the threaded hole 80 in such a manner as to extend in the direction of a tangent to the annular groove 83 at the same side as the upper jaw 20 to thereby communicate with the threaded hole 80. Accordingly, similarly to the inlet 35a of the above-mentioned internal lower-jaw channel 35, the inlet 25a of the internal upper-jaw channel 25 assumes the form of an elongated hole extending obliquely downward and opens at and communicates with the annular groove (groove in the form of a ring) 83, thereby securing a large flow passage area (see FIGS. 5, 7, 9, etc.). The annular groove 83 is an annular space (communication space) formed such that, even though branch holes 75, which will be described next, provided in the threaded shaft 73 of the threaded member 70 face any directions as a result of turn of the threaded member 70, the branch holes 75 and a hollow 77, which will be described next, provided in the threaded shaft 73 communicate with the inlet 25a of the internal upper-jaw channel 25; although unillustrated, such a space may be provided in the form of a circumferentially annular groove in the outer circumferential surface of the threaded shaft 73 at a vertical position of the branch holes 75 or in the form of a combination of an annular groove in the inner circumferential surface of the threaded hole 80 and an annular groove in the outer circumferential surface of the threaded shaft 73.

Meanwhile, the threaded shaft 73 of the threaded member 70 having the head 71 used for clamping has the hollow 77 (see FIGS. 5 to 9, etc.). The hollow 77 opens at the center of a rear end surface 71a of the head (circular head) 71 and extends toward a front end (upper end in the drawings) 78 closed in such a manner as to form the bottom of the hollow 77. In the head 71, a portion of its outer circumferential surface located toward the rear end (rear end surface 71a) is tapered in such a manner as to reduce in diameter toward the rear end. The threaded member 70 has the four branch holes 75 extending horizontally from the hollow 77 to the outer circumferential surface of the thread in a communicating manner and disposed, for example, at circumferential 90-degree intervals, at an intermediate position in the front-rear direction of the threaded shaft 73 (in the present example, a position located slightly toward the front end from the center); specifically, at a position of the above-mentioned annular groove 83 in the front-rear (vertical) direction which the branch holes 75 reach when the threaded member 70 is inserted from the large-diameter hole 60 extending from the lower surface 16 of the holder 10, and the threaded shaft 73 is preliminary screwed into the threaded hole 80 (see FIG. 9, etc.).

The threaded member 70 is designed as follows: when the threaded member 70 is screwed in as mentioned above, its front end 78 slightly sinks below the upper surface 24u of the upper-jaw proximal portion 24 rising from the upper surface 14 of the holder 10; as will be described later, when the threaded member 70 is strongly tightened for clamping the insert 50 disposed between the upper law 20 and the lower jaw 30, its front end 78 becomes approximately flush with or slightly sinks below the upper surface 24u of the upper-jaw proximal portion 24. The threaded shaft 73 has a screw-driving portion (in the present example, a hexagonal hole) 79 provided in its front end 78. The threaded member 70 may have a right-hand thread, but has a left-hand thread in the present example.

In the present example, the above-mentioned threaded member 70 is inserted from the large-diameter hole 60 in the lower jaw 30 of the holder 10; then, the threaded shaft 73 of the threaded member 70 is preliminary screwed into (engaged threadingly with) the threaded hole 80 in the upper jaw 20 to thereby form the cutting tool holder 10; subsequently, a predetermined insert 50 is held between the upper jaw 20 and the lower jaw 30; then, as mentioned above, the threaded member 70 is turned clockwise by turning clockwise the screw-driving portion 79 (e.g., a hexagonal hole) provided in the front end 78 of the threaded shaft 73, whereby the upper jaw 20 is elastically deformed toward the lower jaw 30 to thereby clamp the insert 50, resulting in formation of the cutting tool 100. A coolant supply pipe is connected through a screwed joint or the like to the large-diameter hole 60 extending from the lower surface 16 of the holder 10, and the resultant cutting tool 100 is fixed to the tool rest of a lathe and used for cutting off, etc.

In the present example, in a state in which the predetermined insert 50 is clamped as mentioned above, the frontward surface 72 of the head 71 of the threaded member 70 is seated in a close contact manner on the bearing surface 65 at the bottom of the large-diameter hole 60. Coolant fed into the large-diameter hole 60 flows into the internal lower-jaw channel 35 from the inlet 35a provided at the large diameter hole 60 and is supplied from the discharge opening 36 toward the cutting edge 53 along the front flank 56. In supply of coolant into the internal upper-jaw channel 25, coolant flows from the head 71 side of the threaded member 70 in the large-diameter hole 60 into the hollow 77 and the branch holes 75 of the threaded member 70, reaches the annular groove 83 provided in the inner circumferential surface of the threaded hole 80, flows into the internal upper-jaw channel 25 from the inlet 25a provided at the annular groove 83, and is supplied from the discharge opening 26 toward the cutting edge 53 on the rake face 51 side. In the drawings, an arrow with a broken line indicates the flow of coolant and the direction of the flow.

In such supply of coolant, since the frontward surface 72 of the head 71 of the threaded member 70 is in close contact with the bearing surface 65 at the bottom of the large-diameter hole 60 (the bearing surface 65 serving as the boundary between the large-diameter hole 60 and the small-diameter hole 63 through which the threaded shaft 73 extends), leakage of coolant from the bearing surface 65 can be prevented. In the present example, the bearing surface 65 is flat; however, as mentioned above, an appropriate bearing surface, such as a tapered bearing surface, may be employed in view of the shape, etc., of the frontward surface of the head of the threaded member to be used, so long as the leakage of coolant can be prevented. Also, in the present example, since a rear portion of the outer circumferential surface of the head 71 is tapered such that diameter reduces toward the rear end, a large space is secured between the outer circumferential surface of the head 71 and the coolant inlet (the inlet 35a of the internal lower-jaw channel 35) provided at the large-diameter hole 60; accordingly, coolant fed into the large-diameter hole 60 easily flows into the inlet 35a. Further, since the inlet 35a assumes the form of an elongated hole as mentioned above, supply of coolant under pressure into the internal lower-jaw channel 35 is further smoothed.

In supply of coolant into the internal upper-jaw channel 25, coolant fed into the large-diameter hole 60 flows from the head 71 of the threaded member 70 to the branch holes 75 of the threaded member 70 through the hollow 77 of the threaded shaft 73 and flows, through the annular groove 83 provided in the inner circumferential surface of the threaded hole 80, into the internal upper-jaw channel 25 from the inlet (the inlet 25a of the internal upper-jaw channel 25) provided at the annular groove 83; in this connection, since the outer circumferential surfaces in the front-rear direction of the branch holes 75 provided in the threaded member 70 come into spirally close contact with the threaded hole as a result of screwing (fit between thread ridge and thread root), leakage of coolant toward the slit 41 or toward the upper surface of the upper jaw 20 (the upper surface 24u of the upper-jaw proximal portion 24) does not occur, or, if any, can be limited to a very small amount. Notably, in order to enhance sealing performance through close contact in the form of fit between thread ridge and thread root, accuracy of thread is important; further, effective thread engagement lengths L1 and L2 on the front and rear sides, respectively, of the annular groove 83 as shown in FIG. 6 are important for securing a sufficient length of a spiral close contact surface. The lengths L1 and L2 may be determined appropriately on the basis of a leak verification test.

According to the cutting tool holder 10 and the cutting tool 100 of the present example, coolant can be supplied as desired while leakage of coolant is prevented without need to use an elastic seal such as a rubber O-ring packing used in conventional practice; therefore, an increase in the number of components and complication of structure are not involved. Further, since the cutting tool 100 allows supply of coolant to the cutting edge 53 from both of the upper-jaw 20 side and the lower-jaw 30 side, smooth cutting is realized, and the service life of the cutting edge 53 is extended.

In the present example, as mentioned above, since the threaded member 70 employs left-hand thread, attachment and detachment of the insert 50 and replacement of the cutting edge 53 can be performed substantially in a conventional manner of working, the performance of such work is not deteriorated. Specifically, according to the cutting tool 100 of the present example, for clamping (tightening) or unclamping (loosening) the insert 50, the threaded member 70 can be tightened or loosened, as mentioned above, by turning the screw-driving portion (hexagonal hole) 79 provided in the front end 78 of the threaded shaft 73 of the threaded member 70 screwed in the threaded hole 80, in a manner similar to that of turning a right-handed screw; therefore, the performance of such work is not deteriorated.

The above example has been described while referring to the cutting tool for use in cutting off; however, the present invention can be applied widely to cutting tool holders and cutting tools configured as follows: the cutting insert is disposed between the upper jaw and the lower jaw; the threaded member is disposed in such a manner as to extend across the slit provided between the two jaws; and the threaded member is tightened so as to elastically deform the upper jaw toward the lower law, thereby clamping the insert. Therefore, the present invention can be applied widely to cutting tools having such a structure and used for grooving, etc. In the above example, a single channel and a single discharge opening or inlet are provided in the upper jaw and the lower jaw; however, a plurality of them may be provided. The channel may be routed as appropriate so as to provide good conditions (flow rate and pressure loss) for the flow of liquid coolant; preferably, the number of bends involving a sharp turn is reduced to the greatest possible extent.

The present invention is not limited to the above example, but may be embodied in an appropriately modified form without departing from the gist of the invention. Needless to say, the shapes of the insert and the cutting edge and the number of cutting edges may be selected according to working conditions. Further, gaseous coolant. (e.g., cooling air) may be used in the present invention in place of liquid coolant such as oil coolant, aqueous coolant, etc.

DESCRIPTION OF REFERENCE NUMERALS

10: cutting tool holder; 14: upper surface of holder; 16: lower surface of holder; 20: upper jaw; 21: cutting-insert support surface of upper jaw; 23s: front end of cutting-insert support surface of upper jaw; 24u: upper surface of holder (upper surface of upper-jaw proximal portion); 25: internal upper-jaw channel; 25a: inlet of internal upper-law channel; 30: lower jaw; 31: cutting-insert support surface (upper surface) of lower jaw; 32a: front end of cutting-insert support surface (upper end portion) of lower jaw; 35: internal lower-jaw channel; 35a: inlet of internal lower-jaw channel; 41: slit; 50: cutting insert; 53: cutting edge of cutting insert; 60: large-diameter hole serving as coolant supply opening; 63: small-diameter hole; 65: bearing surface at bottom of large-diameter hole; 70: threaded member having head; 71: head of threaded member; 71a: rear end surface of head of threaded member; 72: frontward surface of head of threaded member; 73: threaded shaft of threaded member; 75: branch hole in threaded shaft; 77: hollow in threaded shaft; 78: front end of threaded shaft; 79: screw-driving portion (hexagonal hole) in front end of threaded shaft; 80: threaded hole; 83: annular groove (recess); and 100: cutting tool.

What is claimed is:

1. A cutting tool holder which comprises an upper jaw and a lower jaw protruding frontward and allowing a cutting insert to be held therebetween at a front end of the holder, has a slit extending rearward of a space between the two jaws, and forms a cutting tool through clamping of the cutting insert held between the two jaws by screwing in and tightening a threaded member having a head, which is disposed in a vertical hole extending vertically across the slit, to thereby elastically deform the upper jaw toward the lower jaw, characterized in that the upper jaw and the lower jaw have a tunnel-shaped internal upper-jaw channel and a tunnel-shaped internal lower-jaw channel, respectively, each having a discharge opening for supplying coolant toward a cutting edge of the cutting insert to be clamped;

the vertical hole extends vertically through the holder;

a portion of the vertical hole extending from a lower surface of the holder toward the slit has a large-diameter hole having an inside diameter greater than an outside diameter of the head of the threaded member and serving as an opening for supplying the coolant, a small-diameter hole extending from a bottom of the large-diameter hole through a bearing surface, smaller in diameter than the large-diameter hole, and allowing clearance fit of a threaded shaft of the threaded member, and an inlet of the internal lower-jaw channel provided in the large-diameter hole;

a portion of the vertical hole extending from the slit toward an upper surface of the holder has a threaded hole threadingly engaged with the threaded shaft of the threaded member, and an inlet of the internal upper-jaw channel provided on an inner circumferential surface of the threaded hole at a vertically intermediate position;

the threaded member has a closed-bottomed hollow which is open at a center of a rear end surface of the head and extends toward a front end of the threaded shaft, and a branch hole which is located at an intermediate position in a front-rear direction of the threaded shaft and through which the hollow communicates with an outer circumferential surface of the threaded shaft;

the threaded member is inserted from the large-diameter hole, the threaded shaft is screwed into the threaded hole until a front surface of the head is seated on the bearing surface located at the bottom of the large-diameter hole, and a recess is formed in at least one of the inner circumferential surface of the threaded hole and the outer circumferential surface of the threaded shaft for establishing communication between the internal upper-jaw channel and the branch hole when the cutting insert is clamped; and the threaded shaft has a screw-driving portion at its front end for allowing tightening and loosening of the threaded shaft from a front-end side thereof.

2. The cutting tool holder according to claim 1, wherein a thread of the threaded member is a left-hand thread.

3. The cutting tool holder according to claim 1, wherein the head of the threaded member is formed such that at least a portion located toward its rear end reduces in outside diameter toward the rear end.

4. The cutting tool holder according to claim 1, wherein in a view of the cutting tool holder from an upper-surface side, the internal upper-jaw channel and the inlet thereof extend in a front-rear direction of the holder along a tangent to the inner circumferential surface of the threaded hole, and the internal lower-jaw channel and the inlet thereof extend in the front-rear direction along a tangent to an inner circumferential surface of the large-diameter hole.

5. The cutting tool holder according to claim 1, wherein a front end of the lower jaw protrudes frontward of a front end of a cutting-insert support surface of the upper jaw, and the front end of the lower jaw is formed such that a portion of the lower jaw located downward of an upper surface of the lower jaw serving as a cutting-insert support surface protrudes frontward in relation to the upper surface of the lower jaw.

6. A cutting tool characterized in that a cutting insert is inserted between the upper jaw and the lower jaw of the cutting tool holder according to claim 1 and is clamped by screwing and tightening the threaded member.

* * * * *